United States Patent [19]
Schmidt et al.

[11] Patent Number: 5,555,613
[45] Date of Patent: Sep. 17, 1996

[54] DRIVE UNIT WITH MOTOR AND PLUG-IN PINION

[75] Inventors: Heinz Schmidt, Dortmund; Kurt Dumke, Sprockhövel, both of Germany

[73] Assignee: Mannesmann Aktiengesellschaft, Dusseldorf, Germany

[21] Appl. No.: 373,046

[22] Filed: Jan. 17, 1995

[30] Foreign Application Priority Data

Jan. 17, 1994 [DE] Germany ................ 44 01 491.0

[51] Int. Cl.⁶ .................................................. B23P 19/04
[52] U.S. Cl. ........................ 29/263; 74/421 A; 403/19
[58] Field of Search .............................. 29/263, 282, 283,
29/234, 237, 272; 269/43; 74/421 A, 421 R;
403/11, 19, 16, 12

[56] References Cited

U.S. PATENT DOCUMENTS 3,408,724  11/1968  Hoeijenbos ........................ 29/263
3,653,115   4/1972  Perkins ............................. 269/43
4,420,864  12/1983  Hoyt ............................... 29/263
5,447,078   9/1995  Robinson et al. ............... 74/421 A

*Primary Examiner*—Robert C. Watson
*Attorney, Agent, or Firm*—Cohen, Pontani, Lieberman, Pavane

[57] ABSTRACT

A drive unit with a motor (1), in the drive shaft (5) of which a plug-in pinion (6) with a conical shaft (6a) which can be mounted into a similarly shaped conical seating bore (5a). The plug-in pinion (6) has on its end face a collar bolt (8) proximate to its toothing (7). The drive shaft (5) has an external groove (5b) proximate to the seating bore (5a). A tool is used to mount and dismount the plug-in pinion (6) by grasping the collar bolt (8) and the external groove (5b) and causing them to move relative to one another.

18 Claims, 3 Drawing Sheets

DRIVE UNIT WITH MOTOR AND PLUG-IN PINION

FIELD OF THE INVENTION

The present invention relates to a drive unit with a motor, in the drive shaft of which a plug-in pinion with a conical shaft can be inserted into a similarly conical seating bore or removed from the seating bore.

BACKGROUND OF THE INVENTION

In devices for mounting and dismounting machine parts onto and from shafts, it is known to separate the shaft and ring connection using a tool having support legs which press against the ring that is to be pulled away, see for example German Patent publication No. DE 30 17 595 A1. However, all known puller devices of this type cannot be used with the drive shaft of a motor's drive unit if the plug-in pinion has a conical shaft which is inserted in a similarly conical seating bore in the motor's drive shaft. This type of drive unit therefore requires a special tool.

In directly-driven toothed gears operating without a clutch, the torque transmission from the motor to the gear is typically accomplished (1) through toothing cut out on the motor shaft, (2) through a pinion mounted on the motor shaft, or (3) through a pinion inserted into the motor shaft, also known as a "plug-in pinion".

While the first design mentioned is useful only for constant transmissions of the primary stage and, even then, for reasons of geometry, only for a limited transmission range, the second and third torque transmission designs allow greater transmission variation as well as subsequent modification of the transmission through exchange of the toothed parts.

The transmission of power in the second and third designs mentioned above can occur through material connection (bonding, soldering, etc.), through frictional connection (longitudinal press, shrink press, and expansion press connections, etc.), or through a combination of these two connection types.

Naturally, positive-locking solutions, such as installed adjusting springs, for example, are also possible.

When mounted pinions are used, only rarely can high transmissions be achieved in the primary stage because the diameter of the motor shaft is sharply limited. Consequently, the plug-in pinion design permits a significantly larger transmission range to be covered. However, plug-in pinions of this type typically are more expensive due to their plug-in pinion connection. While mounted pinions can usually be easily mounted through heating and easily dismounted with the help of a simple puller device, the plug-in pinion connection requires more expensive work steps and tools for both insertion and removal.

SUMMARY OF THE INVENTION

The present invention is directed to a plug-in pinion which may be easily inserted and removed.

The plug-in pinion of the present invention has a collar bolt on its end face proximate to its toothing, and the drive shaft has an external groove in the area of the seating bore. This eliminates the previous mounting and demounting disadvantage and leads in addition to other advantages. With the help of a simple mounting and dismounting device, which is operated either mechanically or hydraulically, the plug-in pinion can be inserted and removed in a problem-free manner during initial mounting or exchange. The same tool can be used for both insertion and removal.

Based on further features of the invention, insertion and removal is accomplished with a tool which grasps the plug-in pinion by a first gripping device which engages behind the collar bolt. The drive shaft is grasped by a second gripping device which engages in the external groove. The positions of the first and the second gripping devices are then adjusted relative to one another preferably in a power-driven fashion. It is thus possible to achieve larger axial forces during mounting and dismounting, which means that the torque can be fully transmitted through friction connection. No other aids, such as adjusting springs, for example, are therefore needed. Furthermore, the plug-in pinion does not need to be completely bored through, and the motor shaft does not need to have a tapped hole. Moreover, production costs are reduced. Another advantage is that the collar bolt on the plug-in pinion can also serve simultaneously as a holding means and as a work drive during the manufacture of the plug-in pinion. Using this same tool, the plug-in pinion can be both mounted (pressed in) and dismounted (pulled out).

According to a further embodiment of the invention, the first gripping device has a divided insert bushing, and the second gripping device has a divided insert ring. The insert bushing is encompassed by a first pipe length, and the divided collar bushing can be encompassed by a second pipe length. The divided collar bushing and the first pipe length are sized so that the divided collar bushing can freely slide relative to the second divided pipe length. In the divided insert bushing there is a first threaded nut set axially and rotatably mounted on a threaded spindle, and in the divided collar bushing there is a second threaded nut set axially and rotatably mounted on the same threaded spindle. For each of the two threaded nuts, the threaded spindle has separate threaded segments having different pitches from one another. Easily interchangeable inserts make only a basic tool necessary for various plug-in pinion sizes and motor shaft diameters. In addition, it is even possible to carry out power- and approach-dependent mounting or dismounting on site.

For this reason, the insert ring and the insert bushing, respectively, are also designed with various inner dimensions and are separately exchangeable.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
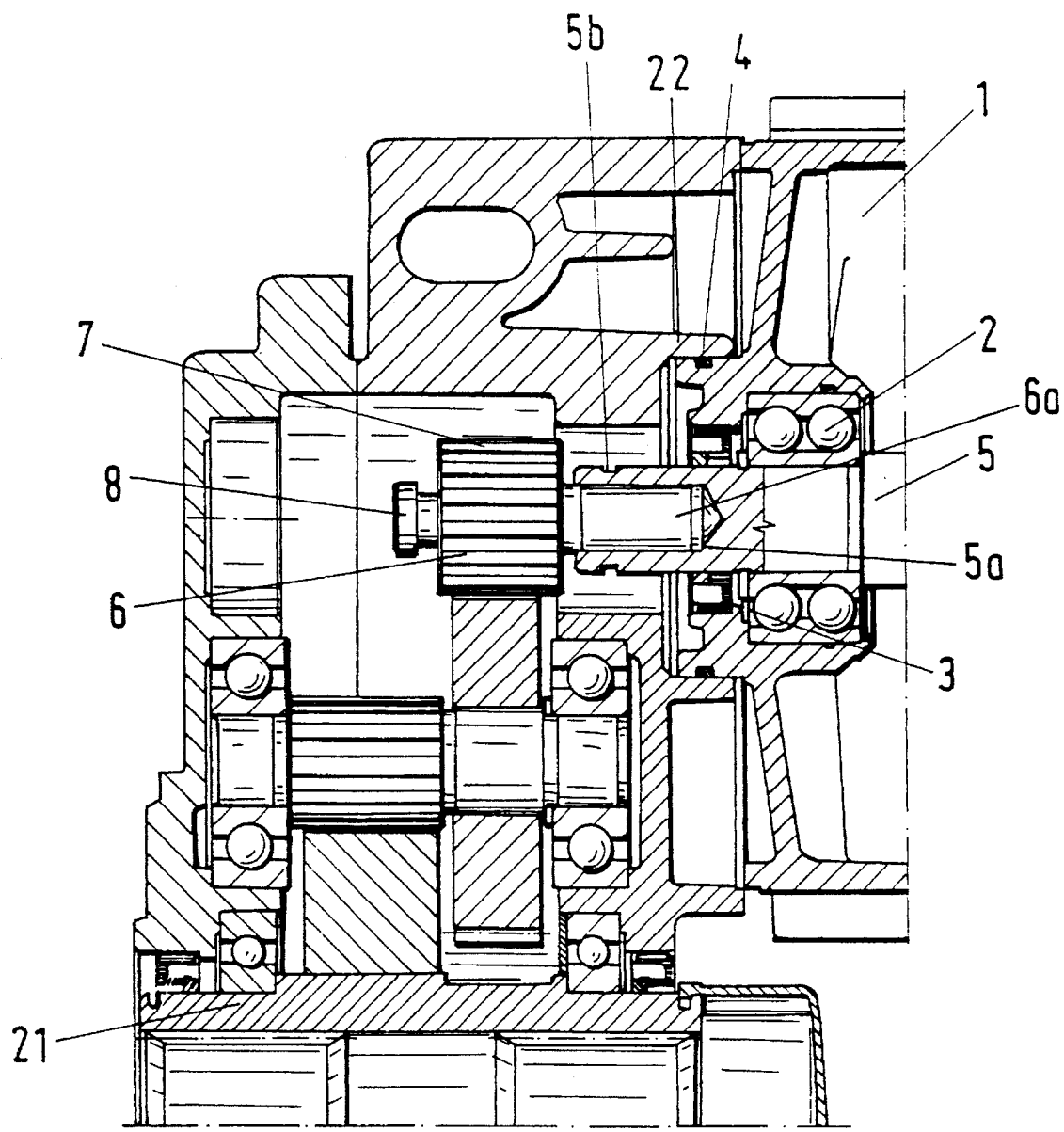
FIG. 1 is an axial longitudinal section through a drive unit with a motor and slip-on gear mechanism.

Referring to FIG. 1, gear 21 with a flange 22 carries a motor 1. The motor 1 has a from bearing 2 with a seal 3 and a seal 4 opposite to the flange 22 of the slip-on gear mechanism 21.

In the from bearing 2, a drive shaft 5 is rotatably supported and has a conical seating bore 5a into which is removably mounted a plug-in pinion 6 with a conical shaft 6a which substantially conforms to the shape of the conical seating bore 5a. The drive shaft 5 has a circumferential external groove 5b proximate to the front area of the seating bore 5a. The plug-in pinion 6 has a circumferential toothing 7 and a collar bolt 8 on the end face of the plug-in pinion 6 proximate to its toothing 7. The collar bolt 8 and the external groove 5b are used to insert or remove the plug-in pinion 6 from the drive shaft 5.

Figure 2:
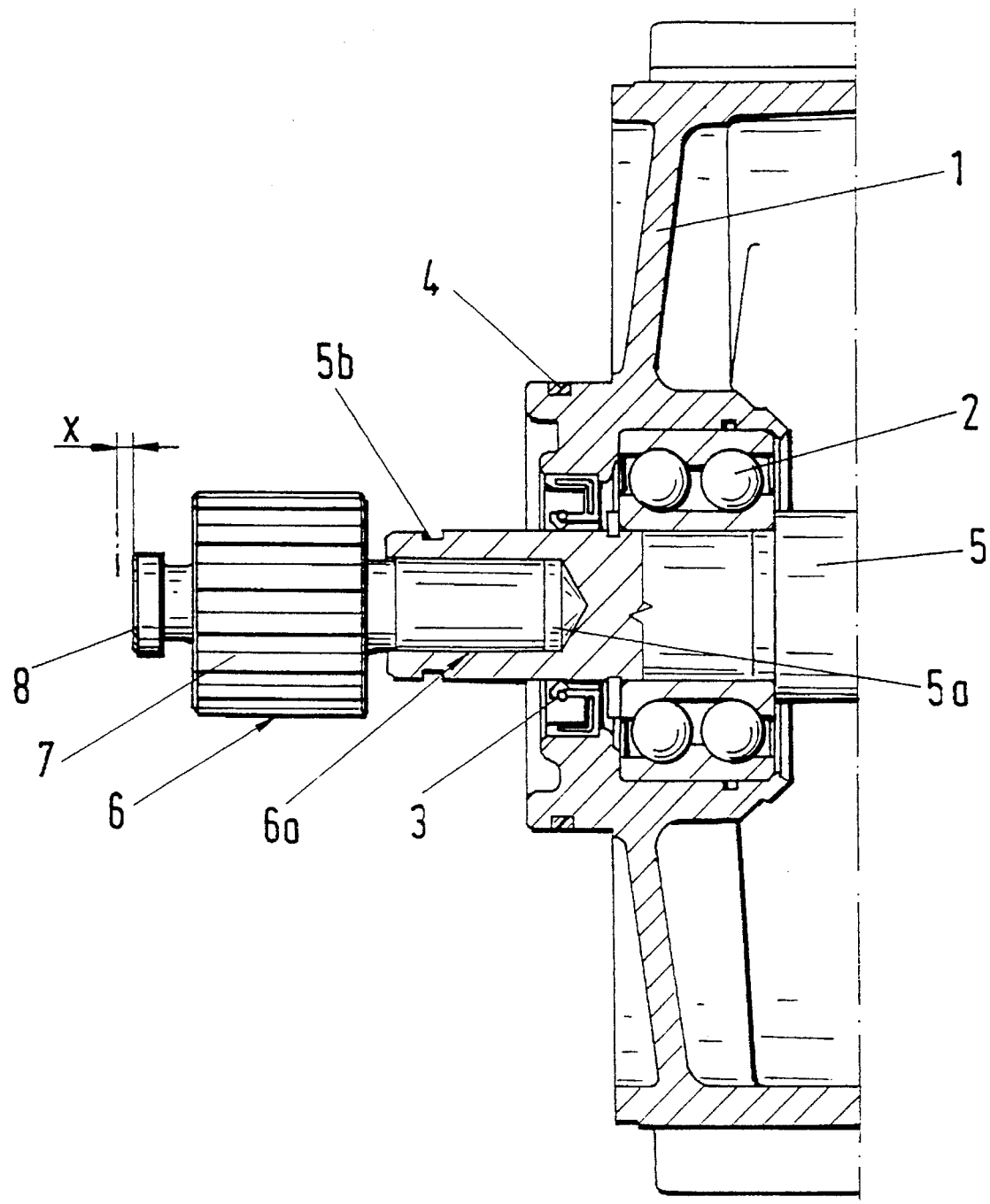
FIG. 2 is the axial longitudinal section of FIG. 1 with the slip-on gear mechanism removed.
Figure 3:
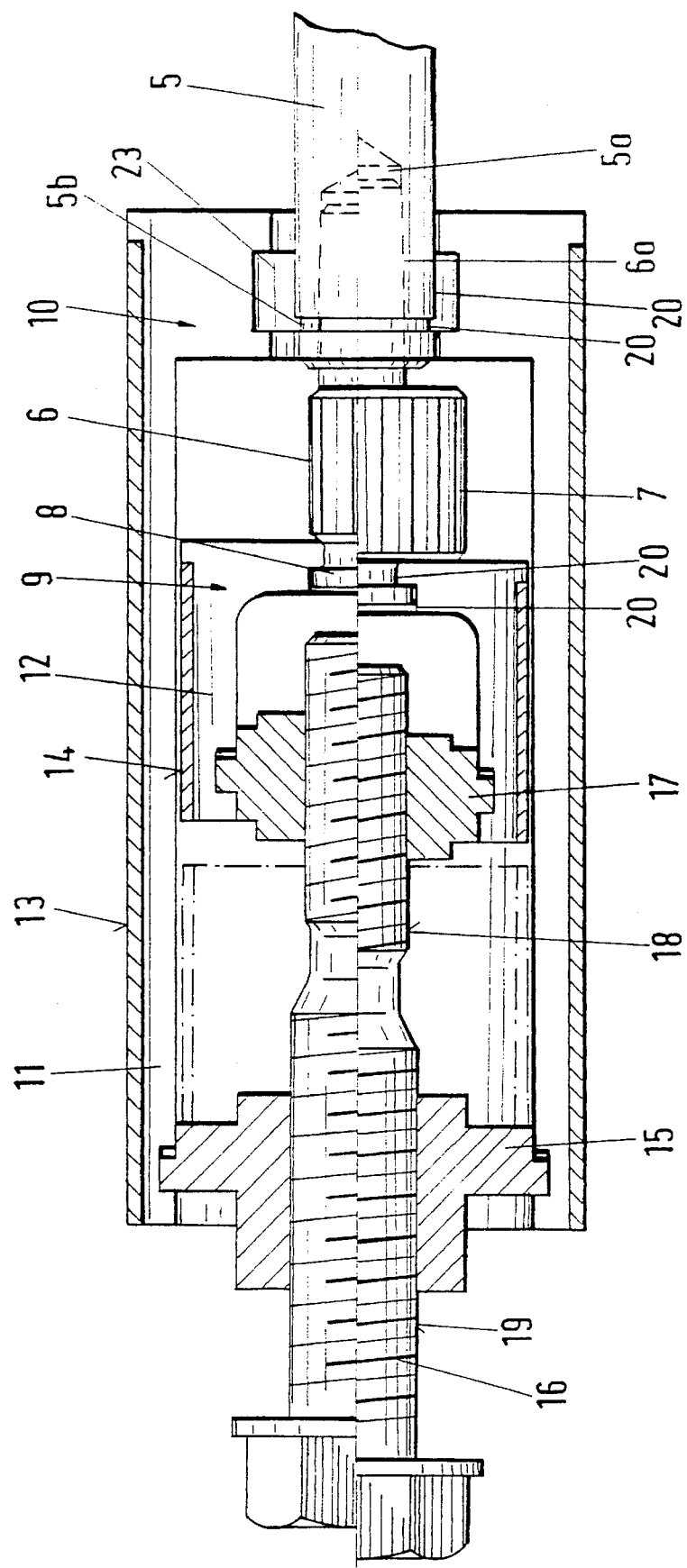
FIG. 3 is an axial longitudinal section through the puller device.

Referring to the top portion of FIG. 3, the plug-in pinion 6 is mounted by a first gripping device 9 which grasps behind the collar bolt 8, and a second gripping device 10 engages the external groove 5b of the drive shaft 5. When the first and the second gripping devices 9, 10 are longitudinally adjusted relative to one another, preferably by being power-driven, the plug-in pinion 6 is either inserted into or pulled out of the conical seating bore 5a of drive shaft 5 by a distance X as shown in FIG. 2.

Referring again to the top half of FIG. 3, the first gripping device 9 has a divided insert bushing 12, and the second gripping device 10 has a divided collar bushing 11 and a divided insert ring 23. The collar bushing 11 is encompassed by a second pipe length 13. In the divided collar bushing 11, there is a second nut 15 fixed axially and screwed onto a threaded spindle 16. The divided insert bushing 12 is encompassed by a first pipe length 14 and is sized so that the divided collar bushing 11 surrounds the first pipe length 14 and so that divided collar brushing 11 and first pipe length 14 may slide relative to one another. The first pipe length 14 encloses a first threaded nut 17 and fixed axially and is screwed onto the threaded spindle 16.

The threaded spindle 16 has two threaded segments 18, 19 for threaded engagement with nuts 17, 15, respectively. The thread in the two threaded segments 18, 19 are different from one another. When the threaded spindle 16 is turned, the first and second threaded nuts 17, 15 move relative to one another.

For plug-in pinions 6 and drive shafts 5 of different dimensions as shown in the lower portion of FIG. 3, the insert ring 23 and the insert bushing 12, respectively, have different inner dimensions 20 and can be separately exchanged.

Although the drive shaft 5 is described as having a conical bore 5a and the plug-in pinion 6 is described as having a conical shaft 6a, alternatively, the drive shaft 5 may have a conical shaft and the plug-in pinion may have a conical bore.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto. It is also to be understood that the drawings are not necessarily drawn to scale but are merely conceptual schematic drawings.

What is claimed is:

1. A drive unit and motor combination wherein the drive unit is removably connected to the motor, comprising:

a motor having a drive shaft (5) with a conical seating bore (5a), the drive shaft (5) comprising an external groove (5b) proximate to the seating bore (5a); and a drive unit having a plug-in pinion (6) with a conical shaft (6a) sized and shaped to be removably mounted into the conical seating bore (5a) of the drive shaft (5), the plug-in pinion (6) comprising a collar bolt (8) on an end face thereof proximate to toothing (7) formed on the plug-in pinion (6).

2. A plug-in pinion mounting and dismounting tool for a drive unit removably mounted on to a motor comprising:

a first gripping device (9) sized and shaped to removably engage and grasp a collar bolt (8) formed on an end face of a plug-in pinion (6) of the drive unit;

a second gripping device (10) sized and shaped to removably engage and grasp an external groove (5b) of a drive shaft (5) of the motor, the first and second gripping devices (9, 10) being coaxially mounted and longitudinally adjustable relative to one another;

a threaded spindle (16) having first and second threaded segments longitudinally separate from one another, said two threaded segments having different thread pitches;

a first threaded nut (17) mounted in the first gripping device (9), and being rotatably mounted on said first threaded segment; and a second threaded nut (15) mounted in the second gripping device (10) and being rotatably mounted on said second threaded segment;

said first and second threaded nuts (17, 15) being coaxially and rotatably mounted on said threaded spindle so that rotation of said threaded spindle (16) causes the first and second gripping devices (9, 10) to move relative to one another.

3. The plug-in pinion mounting and dismounting tool of claim 2, wherein the first gripping device (9) further comprises:

a first divided pipe length (14); and an insert bushing (12) within which the first threaded nut (17) is mounted, the insert bushing (12) being sized and shaped to removably engage and grasp the collar bolt (8) on the plug-in pinion (6) of the drive unit, the insert bushing (12) being mounted within the first divided pipe length (14).

4. The plug-in pinion mounting and dismounting tool of claim 2, wherein the second gripping device (10) further comprises:

a second pipe length (13);

a divided insert ring (23) sized and shaped to removably engage and grasp the external groove (5b) of the drive shaft (5) of the motor; and a divided collar bushing (11), within which the second threaded nut (15) and the divided insert ring (23) are mounted, the divided collar bushing (11) being mounted within the second divided pipe length (13).

5. The plug-in pinion mounting and dismounting tool of claim 3, wherein the second gripping device (10) further comprises:

a second pipe length (13);

a divided insert ring (23) sized and shaped to removably engage and grasp the external groove (5b) of the drive shaft (5) of the motor; and a divided collar bushing (11), within which the second threaded nut (15) and the divided insert ring (23) are mounted, the divided collar bushing (11) being mounted within the second divided pipe length (13);

wherein the first pipe length (14) is slidably mounted within the divided collar bushing (11).

6. The plug-in pinion mounting and dismounting tool of claim 3, wherein the insert bushing (12) is removably mounted within the first divided pipe length (14).

7. The plug-in pinion mounting and dismounting tool of claim 5, wherein the insert bushing (12) is removably mounted within the first divided pipe length (14).

8. The plug-in pinion mounting and dismounting tool of claim 4, wherein the divided insert ring (23) is removably mounted within the divided collar bushing (11).

9. The plug-in pinion mounting and dismounting tool of claim 5, wherein the divided insert ring (23) is removably mounted within the divided collar bushing (11).

10. A drive unit, motor and plug-in pinion mounting and dismounting tool combination wherein the drive unit is removably connected to the motor and wherein the plug-in pinion is used for mounting and dismounting the drive unit to and from the motor, comprising:

a motor having a drive shaft (5) with a conical seating bore (5a), the drive shaft (5) comprising an external groove (5b) proximate to the seating bore (5a);

a drive unit having a plug-in pinion (6) with a conical shaft (6a) sized and shaped to be removably mounted into the conical seating bore (5a) of the drive shaft (5), the plug-in pinion (6) comprising a collar bolt (8) on an end face thereof proximate to toothing (7) formed on the plug-in pinion (6); and a plug-in pinion mounting and dismounting tool comprising:
    a first gripping device (9) sized and shaped to removably engage and grasp a collar bolt (8) formed on an end face of a plug-in pinion (6) of the drive unit, and
    a second gripping device (10) sized and shaped to removably engage and grasp an external groove (5b) of a drive shaft (5) of the motor,
    the first and second gripping devices (9, 10) being coaxially mounted and longitudinally adjustable relative to one another.

11. The plug-in pinion mounting and dismounting tool of claim 10, further comprising:

a threaded spindle (16) having first and second threaded segments longitudinally separate from one another, said two threaded segments having different thread pitches;

a first threaded nut (17) mounted in the first gripping device (9), and being rotatably mounted on said first threaded segment; and a second threaded nut (15) mounted in the second gripping device (10) and being rotatably mounted on said second threaded segment, said first and second threaded nuts (17, 15) being coaxially and rotatably mounted on said threaded spindle so that rotation of said threaded spindle (16) causes the first and second gripping devices (9, 10) to move relative to one another.

12. The plug-in pinion mounting and dismounting tool of claim 11, wherein the first gripping device (9) further comprises:

a first divided pipe length (14); and an insert bushing (12) within which the first threaded nut (17) is mounted, the insert bushing (12) being sized and shaped to removably engage and grasp the collar bolt (8) on the plug-in pinion (6) of the drive unit, the insert bushing (12) being mounted within the first divided pipe length (14).

13. The plug-in pinion mounting and dismounting tool of claim 11, wherein the second gripping device (10) further comprises:

a second pipe length (13);

a divided insert ring (23) sized and shaped to removably engage and grasp the external groove (5b) of the drive shaft (5) of the motor; and a divided collar bushing (11), within which the second threaded nut (15) and the divided insert ring (23) are mounted, the divided collar bushing (11) being mounted within the second divided pipe length (13).

14. The plug-in pinion mounting and dismounting tool of claim 12, wherein the second gripping device (10) further comprises:

a second pipe length (13);

a divided insert ring (23) sized and shaped to removably engage and grasp the external groove (5b) of the drive shaft (5) of the motor; and a divided collar bushing (11), within which the second threaded nut (15) and the divided insert ring (23) are mounted, the divided collar bushing (11) being mounted within the second divided pipe length (13);

wherein the first pipe length (14) is slidably mounted within the divided collar bushing (11).

15. The plug-in pinion mounting and dismounting tool of claim 12, wherein the insert bushing (12) is removably mounted within the first divided pipe length (14).

16. The plug-in pinion mounting and dismounting tool of claim 14, wherein the insert bushing (12) is removably mounted within the first divided pipe length (14).

17. The plug-in pinion mounting and dismounting tool of claim 14, wherein the divided insert ring (23) is removably mounted within the divided collar bushing (11).

18. The plug-in pinion mounting and dismounting tool of claim 14, wherein the divided insert ring (23) is removably mounted within the divided collar bushing (11).

* * * * *